(12) United States Patent
Corley

(10) Patent No.: US 6,413,052 B1
(45) Date of Patent: Jul. 2, 2002

(54) ANTI-FRETTING WASHER FOR FLANGE JOINTS

(75) Inventor: Thomas Corley, Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 09/639,035

(22) Filed: Aug. 15, 2000

(51) Int. Cl.[7] ................................ F03D 11/00
(52) U.S. Cl. ................ 416/244 R; 416/204 R; 416/214 R
(58) Field of Search .................. 416/244 R, 204 R, 416/220 R, 220 A

(56) References Cited

U.S. PATENT DOCUMENTS

| | | | |
|---|---|---|---|
| 4,047,839 A | * 9/1977 | Ferris et al. | 416/414 |
| 4,321,011 A | * 3/1982 | Hori et al. | 416/214 R |
| 4,605,355 A | * 8/1986 | Davis et al. | 416/208 |
| 5,057,353 A | * 10/1991 | Maranci et al. | 428/147 |
| 5,565,514 A | * 10/1996 | Carlberg | 524/494 |
| 5,989,375 A | * 11/1999 | Bortz | 156/148 |
| 6,062,569 A | * 5/2000 | Strasser et al. | 277/434 |
| 6,210,786 B1 | * 4/2001 | Atmur et al. | 428/293.4 |

* cited by examiner

Primary Examiner—F. Daniel Lopez
Assistant Examiner—James M McAleenan

(57) ABSTRACT

Fretting problems between clamped parts as, for example, flanges and aircraft power trains, is substantially eliminated through the use of a shim placed between the clamped flanges and which is rich in polytetrafluoroethylene at its surfaces abutting the flanges and includes an interior matrix of a strength giving fiber such as glass fiber.

10 Claims, 2 Drawing Sheets

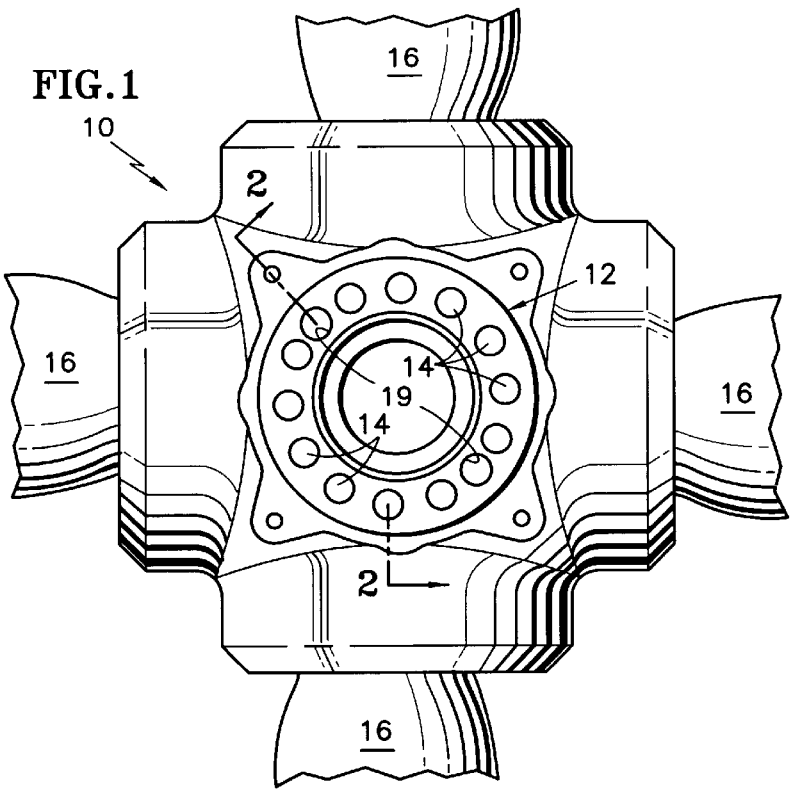
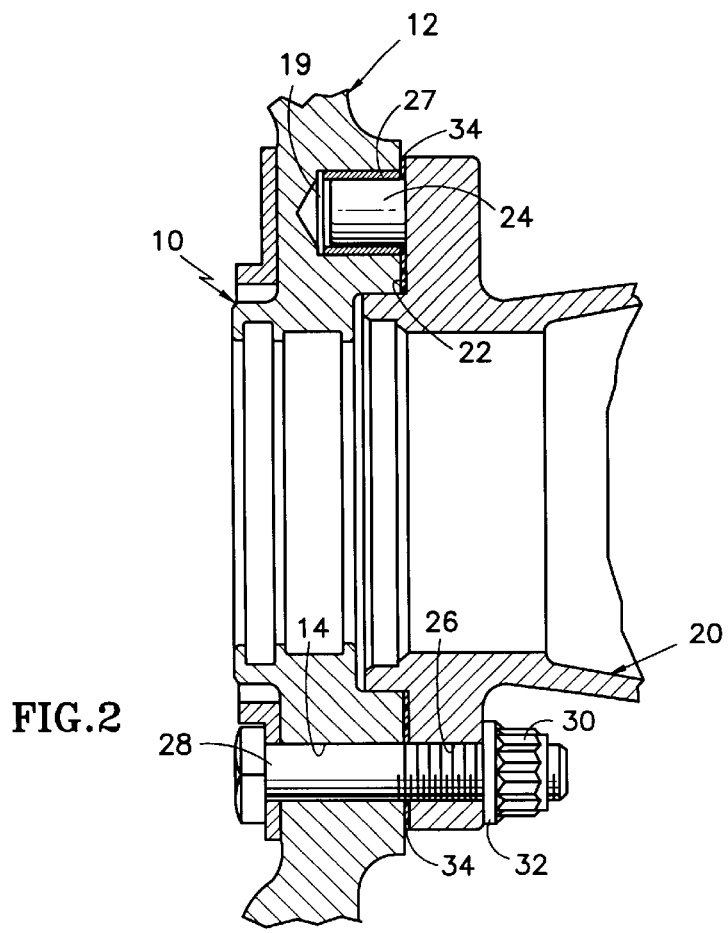

ANTI-FRETTING WASHER FOR FLANGE JOINTS

FIELD OF THE INVENTION

This invention relates to a means to prevent fretting, and more specifically, to an anti-fretting washer or shim to be received between two flanges that are clamped together.

BACKGROUND OF THE INVENTION

Many connections, particularly in power trains, involve the clamping of two flanged parts together. One of many possible examples includes the connection between the output shaft of an aircraft power plant and the hub of a propeller.

In operation of such devices, varying loading on one or the other of the flanged parts causes minute relative movement between the two. This in turn leads to fretting and deformation of one or the other or both of the mounting flanges. Damage to the parts may also occur when the fretting, though not severe enough to physically damage the flanges themselves, causes undue wear of protective coatings or the like, thereby exposing the joint flanges to corrosion or other deleterious effects of the environment.

Needless to say, regardless of the type of equipment involved or the operating environment concerned, such damage is highly undesirable from the standpoint that it must be corrected to assure that the equipment employing the joint operates properly. Moreover, it would be highly desirable that some sort of solution to the fretting problem could be devised. It would be even more desirable that the solution be a long lived solution so as to minimize the need for periodic replacement of components as part of a preventive maintenance program.

The present invention is directed to providing just such a solution.

SUMMARY OF THE INVENTION

It is a principal object of the invention to provide a new and improved means of minimizing or eliminating fretting between two mating flanges as may be used in a power train. Even more specifically, it is an object of the invention to provide an anti-fretting shim for use in an aircraft power train as, for example, at the joint between an aircraft power plant output shaft and the hub of a propeller.

An exemplary embodiment of the invention achieves the foregoing object in a shim or washer construction that is adapted for disposition between two mating flanges which are intended to be clamped together. The shim, according to a highly preferred embodiment, comprises a thin, generally circular, planar disc having an open center and an outer peripheral edge. A plurality of angularly spaced bolt holes are located between the open center and the peripheral edge. The shim is a laminate of two sheets bonded together, each sheet consisting essentially of a glass fiber and polytetrafluoroethylene matrix with one side being rich in polytetrafluoroethylene and the other side being rich in glass fiber. The sides of the sheets that are rich in glass fiber are abutted and bonded together.

According to a more specific environment of usage, the invention contemplates use in an aircraft having a propeller including a hub and a power plant for rotating the propeller by a power plant output shaft affixed to the hub. The assembly includes first and second mating flanges and clamping devices for clamping the flanges together. The invention contemplates the improvement of a shim or washer clamped between the flanges including a composite disc having opposed sides and a fiber matrix including a polymeric material with a low coefficient of friction. The distribution of the polymeric material is such that the polymeric material exists in the greatest percentage at the opposed sides and the distribution of the fiber is such that it exists in the greater percentage inwardly of the opposed sides.

In one embodiment, one of the flanges is on the aircraft propeller hub and the other is on the power plant output shaft.

In a preferred embodiment, the clamping device is comprised of bolts.

In another embodiment, the fiber matrix is a fiberglass containing matrix.

Preferably, the matrix is a woven matrix.

In one embodiment, the polymeric material is polytetrafluoroethylene.

In a highly preferred embodiment, the shim is formed of two sheets, each having one side rich in the fiber matrix and an opposite side rich in the polymeric material with the one side of both layers bonded to each other, preferably by an epoxy material.

Other objects and advantages will become apparent from the following specification taken in connection with the accompanying drawings.

DESCRIPTION OF THE DRAWINGS

FIG. 1 is a fragmentary, view of an aircraft propeller with which the invention may be used;

FIG. 2 is an enlarged, fragmentary, sectional view taken approximately along the line 2—2 in FIG. 1;

DESCRIPTION OF THE PREFERRED EMBODIMENT

Figure 3:
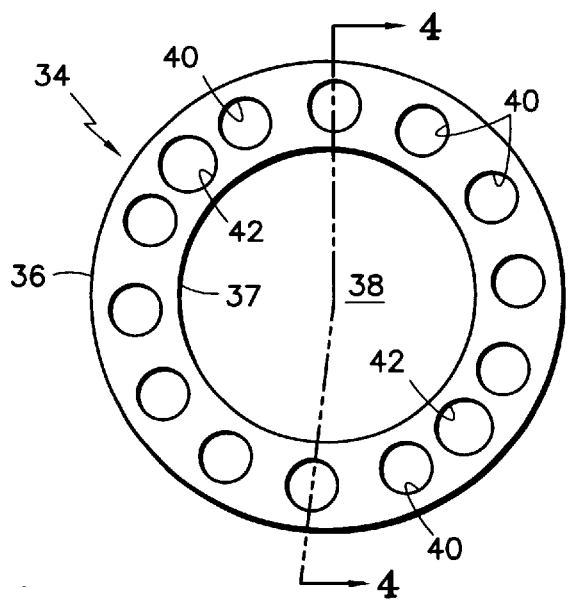
FIG. 3 is a plan view of a shim made according to the invention.

At the outset, it should be noted that while the following description of the invention is in the context of a power train for a propeller driven aircraft, no limitation to that specific use or structure is intended except insofar as expressed in the appended claims.

With reference to FIG. 1, a conventional aircraft propeller hub, generally designated 10, is illustrated. The hub 10 includes a flange, generally designated 12, for attachment to the output shaft of the aircraft power plant and to this end, is provided with a plurality of bores 14 which receive bolts by which the output shaft of the aircraft power plant is connected to the hub 10.

At four equally angularly spaced locations about the hub 10, aircraft propeller blades 16 are illustrated fragmentarily. It should be recognized, however, that the invention is not restricted to use with four bladed propellers but may be employed with efficacy in propeller constructions having a greater or lesser number of propeller blades 16.

In the usual case, the propeller will be a variable pitch propeller and to this end, a conventional pitch control mechanism (not shown), is mounted within the hub 10 and is accessible through an opening (not shown) on the opposite side of the hub 10 from the flange 12.

In addition to the foregoing, diametrically opposite locating bores 19 are provided in the hub 10 for receipt of dowel pins.

As seen in FIG. 2, an output shaft 20 for the aircraft power plant is illustrated. The same includes a flange 22 which is adapted to substantially abut the flange 12. The shaft 20, on the flange 22, has dowel pins 24 for receipt in the bores 19. Conventionally, bushings 27 will surround the dowel pins 24. The shaft 20 also includes, in the flange 22, a plurality of bores 26 which are aligned with the bores 14 in the flange 12. Bolts 28 are passed through the aligned bores 14 to receive lock nuts 30 with integral flanges 32. The bolts 28 and nuts 30 act to clamp the shaft 20 to the hub 10 with the clamping force being exerted in a direction normal to the surfaces of the flanges 12 and 22.

According to the invention, a washer or shim 34 is disposed at the interface of the flanges 12 and 22 for the purpose of preventing fretting at that location as a result of minuscule relative motion between the hub 10 and the shaft 20 due to varying loading placed on the hub 10 by the propeller blades 16 in operation.

As illustrated in FIG. 3, the shim 34 is a generally circular disc having a circular outer periphery 36 as well as a central opening 38 which is bounded by a circular periphery 37. A series of holes 40 are located between the opening 38 and the periphery 36 and aligned with the bores 14, 26 in the hub 10 and the shaft 20 respectively. Also included are diametrically opposite holes 42 for receipt of the dowel pins 24.

Figure 4:
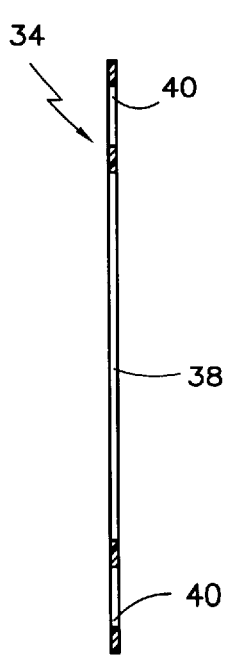
FIG. 4 is a sectional view of the shim taken approximately along the line 4—4 of FIG. 3.
Figure 5:
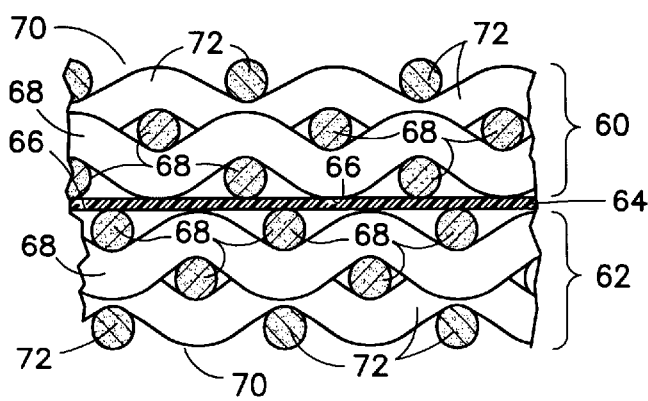
FIG. 5 is a somewhat schematic, fragmentary sectional view of the shim.

As seen in FIG. 4, the shim 34 is quite thin. Typically, its thickness will be on the order of 0.030 inches and in the usual case, will be in the approximate range of 0.0272 to 0.030 inches. In a preferred embodiment, it is a woven matrix made up of strength producing fibers such as glass fibers and polymeric fibers of a low coefficient of friction such as polytetrafluoroethylene fibers and sold under the registered trademark TUFLITE®. The material is available from Rexnord Corp. of Downers Grove, Ill. in square sheets as supplier Part Nos. 599-214-214-01; 599-259-259-01; and 599-128128-01. The sheets supplied under those part numbers are in fact made up of two separate sheets into a composite as illustrated in FIG. 5. The sheets labeled 60 and 62 therein. The two sheets 60, 62 are bonded together by a thin layer of adhesive 64, typically an epoxy adhesive. As the sheets 60, 62 are identical, only the sheet 60 will be described. Each sheet 60, 62 is a woven matrix that has one side 66 which is rich in the strength producing fiber, specifically glass fiber 68. The other side 70 of the sheet 60 is made up of the polymeric fiber 72 so as to be rich in that material. Typically, polytetrafluoroethylene is employed in making up the fibers 72. The arrangement is such that the two sides 66 that are rich in the strength producing fiber 68 are bonded together so that the side 70 rich in the polymeric material having a low coefficient of friction will be outermost in the resulting composite as illustrated in FIG. 5.

The shim may be formed into the configuration illustrated in FIG. 3 by die cutting, machining or laser cutting. When machined into the configuration, the same is located between two metal plates and conventional machining techniques employed to define the boundaries and the locations of the holes in the shim. Laser cutting is a preferred method of forming.

The shim of the present invention is highly advantageous in that it withstands high clamping loads when the flanges are clamped together by the bolts 28 and nuts 30. It is, however, to be understood that in some applications, clamping devices other than bolts and nuts may be used. Fretting is substantially eliminated and initial testing has indicated that the shim has an operational life of about 10,000 hours which, in the case of aircraft propeller and power plant applications exceeds the time between major overhauls. Moreover, the shim can be employed at the interface of the propeller hub and the internal blade pitch adjusting mechanism as well. As a consequence, maintenance requirements are minimized because the shim generally need not be replaced between major overhauls. Thus, a long lived, relatively maintenance free solution to fretting problems between parts that are clamped together is provided.

I claim:

1. In an aircraft having a propeller including a hub and a power plant for rotating the propeller by a power plant output shaft affixed to the hub, and including first and second mating flanges and clamping devices clamping the flanges together, the improvement comprising a shim clamped between said flanges said shim formed of a laminate of two sheets having opposed sides and each sheet having a fiber matrix including a polymeric material with a low coefficient of friction and a strength imparting fiber, with the distribution of the polymeric material being the greatest at the opposed sides and the distribution of the strength imparting fiber being the greatest inwardly of said opposed sides.

2. The combination of claim 1 wherein one of said flanges is on said hub and the other is on said power plant output shaft.

3. The combination of claim 1 wherein said clamping devices comprise bolts.

4. The combination of claim 1 wherein said strength imparting fiber is fiber glass.

5. The combination of claim 1 wherein said matrix is a woven matrix.

6. The combination of claim 1 wherein said polymeric material is polytetrafluoroethylene.

7. An aircraft propeller including:

a propeller hub;

a flange on said hub;

bolts for clamping a mating flange to said flange on said hub; and a shim abutting said flange on said hub and adapted to be clamped between said flange on said hub and a mating flange, said shim being a disc of a thickness on the order of 0.030 inches or less with opposed, generally parallel sides, and formed of a laminate of two sheets each made up of a matrix including polytetrafluoroethylene and glass fiber, with the distribution of polytetrafluoroethylene being the greatest at one of said sides and the distribution of glass fiber being the greatest at the other and laminated with said other sides of said two sheets abutted.

8. The aircraft propeller of claim 7 wherein said other sides are bonded together.

9. The aircraft propeller of claim 7 wherein glass fibers are woven together to form said matrix.

10. A shim for disposition between two mating flanges adapted to be clamped together, comprising:

a thin, generally circular planar disc having an open center and an outer peripheral edge;

a plurality of angularly spaced bolt holes located between said open center and said peripheral edge;

said shim being a laminate of two sheets bonded together, each sheet consisting essentially of a matrix of glass fiber and polytetrafluoroethylene with the distribution of polytetrafluoroethylene being the greatest at a first side of each sheet and the distribution of the glass fiber being the greatest at a second side of each sheet and with the second sides of the sheets being abutted and bonded together.

* * * * *